United States Patent [19]

Yoshimi et al.

[11] 4,456,055
[45] Jun. 26, 1984

[54] AUTOMOTIVE AIR CONDITIONER HAVING COATING POWER CONTROL DEVICE

[75] Inventors: Akiro Yoshimi, Kariya; Michihiko Kamiya, Handa; Yasuhumi Kojima; Fumio Ootsuka, both of Gifu; Takeo Matsushima, Toyota, all of Japan

[73] Assignees: Nippondenso Co., Ltd., Kariya; Toyota Jidosha Kogyo Kabushiki Kaisha, Toyota, both of Japan

[21] Appl. No.: 347,025

[22] Filed: Feb. 8, 1982

[30] Foreign Application Priority Data

Feb. 12, 1981 [JP]   Japan .................................. 56-19762

[51] Int. Cl.³ ............................................. F28F 13/00
[52] U.S. Cl. ........................................ 165/12; 165/42; 165/43; 62/244; 237/2 B
[58] Field of Search ................... 165/12, 40, 42, 43; 62/228, 229, 244; 237/213

[56] References Cited

U.S. PATENT DOCUMENTS

| | | |
|---|---|---|
| 3,315,730 | 4/1967 | Weaver et al. |
| 4,259,722 | 3/1981 | Iwata et al. ............... 165/42 |
| 4,325,426 | 4/1982 | Otsuka et al. ............. 165/43 |
| 4,344,565 | 8/1982 | Kojima et al. ............. 165/12 |
| 4,358,936 | 11/1982 | Ito et al. ................... 165/43 |

FOREIGN PATENT DOCUMENTS

| | | |
|---|---|---|
| 2379392 | 10/1978 | France ..................... 165/43 |
| 51-120536 | 10/1976 | Japan . |
| 55-77659 | 6/1980 | Japan . |

Primary Examiner—William R. Cline
Assistant Examiner—John M. Kramer
Attorney, Agent, or Firm—Cushman, Darby & Cushman

[57] ABSTRACT

An automotive air conditioner device includes an air duct, a blower motor for producing an air stream to be supplied to an automotive passenger compartment through the air duct, a heat exchanger having a heater and a cooling device, and an electronic control device. The electronic control device includes various sensors, a microcomputer for executing computation processings of output signals from the various sensors in accordance with a predetermined program and producing a first and a second control signal, a drive circuit responsive to the first control signal for changing a temperature adjusting value of the heat exchanger and another drive circuit responsive to the second control signal for changing the cooling power of the cooling device, thereby to control the air temperature within the automotive passenger compartment at a desired value.

9 Claims, 2 Drawing Figures

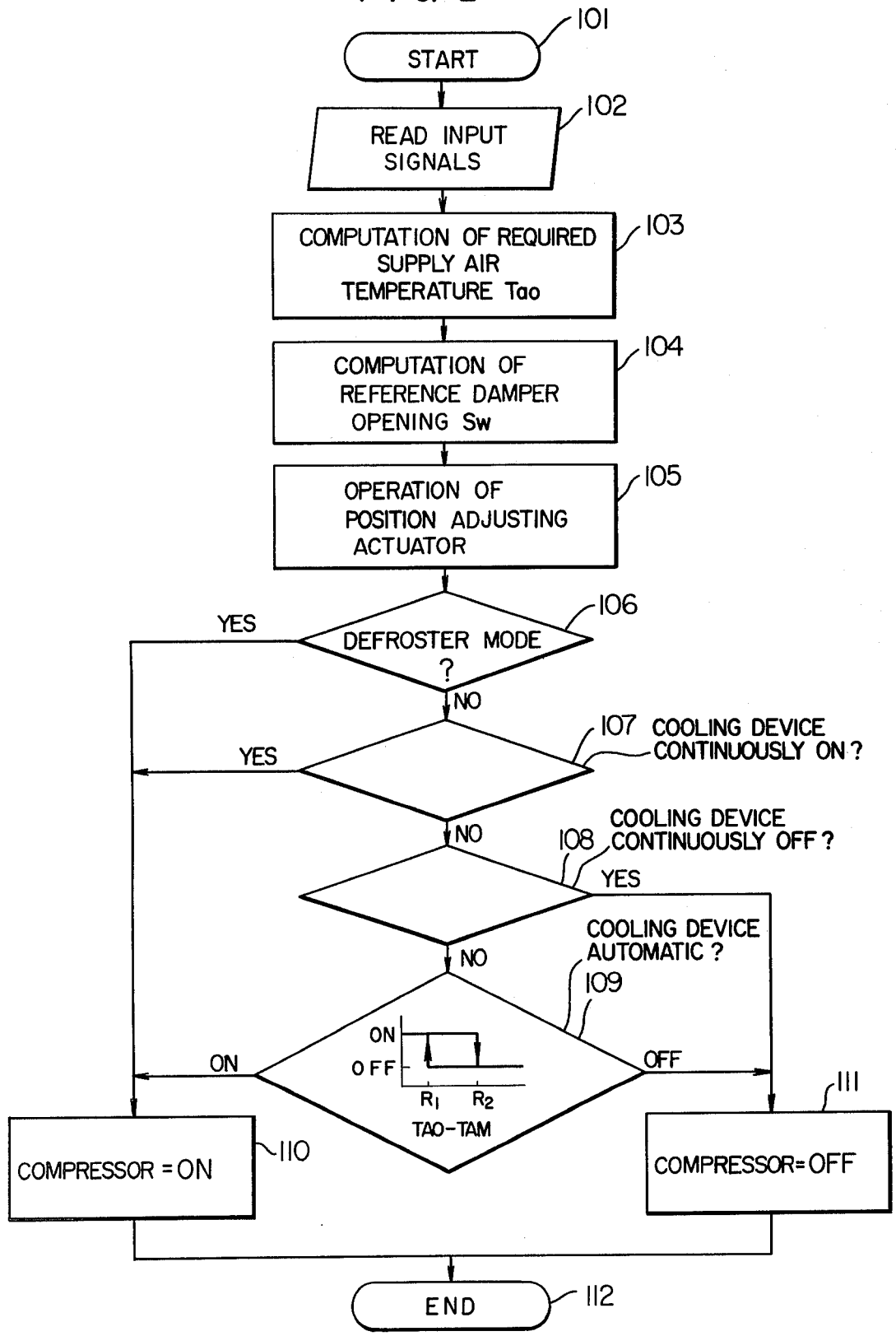

AUTOMOTIVE AIR CONDITIONER HAVING COATING POWER CONTROL DEVICE

BACKGROUND OF THE INVENTION

1. Field of the Invention

The present invention relates to an automotive air conditioner and, more particularly, to an automotive air conditioner having a cooling power control device for effectively controlling a cooling power of a cooling device which is fed by a car-carried electric power source.

2. Description of the Prior Art

In the field of the automotive air conditioner, a method of automatically controlling the cooling power of a cooling device fed by a car-carried power source in order to attain energy-saving has been disclosed in Japanese Patent Application Kokai (Laid-Open) No. 120536/76 in which, by means of a switch mechanically interlocked with a position of a temperature regulating member, such as air mixing damper, a cooling device, e.g. a known compressor in cooling operation, is intermittently disconnected from the car-carried electric power source by an electromagnetic clutch.

However, since the prior art cooling power control device is controlled by the temperature regulating member, it is not possible to accurately determine an actual thermal condition in an automotive passenger compartment (hereinafter referred to as passenger compartment). The temperature regulating member will be affected by a number of factors, including a change in the heat exchanging power of a heat exchanger located in an air duct, a change of the rotational speed of the compressor due to variations in the rotational speed of the engine, a temperature change of the cooling water of the engine which acts as a heat source, or a change in the temperature of air outside the passenger compartment. Such changes often give rise to a hunting phenomenon in the driving and stopping operations of the compressor. To avoid such hunting, the conditions for decision must be made less severe, and therefore it has been difficult to attain precise energy efficiency.

SUMMARY OF THE INVENTION

Accordingly, an object of the present invention is to provide an automotive air conditioner device comprising a cooling power control device which is free from the drawback of the prior art and which can attain good temperature control by controlling the cooling power of the cooling device in accordance with the temperature of supply air.

In accordance with the present invention, there is provided an automotive air conditioner having a cooling power control device for automatically controlling the cooling power of the air conditioner in response to a variety of conditions including the temperature in the passenger compartment, comprising an air duct means for supplying air to the passenger compartment; a blower motor for producing an air stream in the air duct means to supply air to the passenger compartment; heat exchanger means including a cooling device and a heater disposed in the air duct for effecting heat-exchange of the air stream, thereby adjusting the temperature of the air stream, sensor means for measuring a temperature of air taken into the air duct means; electronic control means for computing a temperature of air taken into the passenger compartment from the air duct means necessary for making the passenger compartment temperature close to its desired value and for keeping its state in accordance with the air conditioning conditions through an electrical computation, for producing a first electrical signal to command a temperature adjusting value of the heat exchanger means in accordance with the result of the computation, and for comparing the result of the computation with an output of the sensor means to provide a second electrical signal to command controlling of the cooling power of the cooling device; first drive means responsive to the first electrical signal from the control means to change the temperature adjusting value of the heat exchanger means; and second drive means responsive to the second electrical signal from the control means to control the cooling power of the cooling device.

BRIEF DESCRIPTION OF THE DRAWINGS

FIG. 2 is a flow chart showing the computation processing of a digital computer used in the circuit of FIG. 1.

DESCRIPTION OF THE PREFERRED EMBODIMENT

Figure 1:
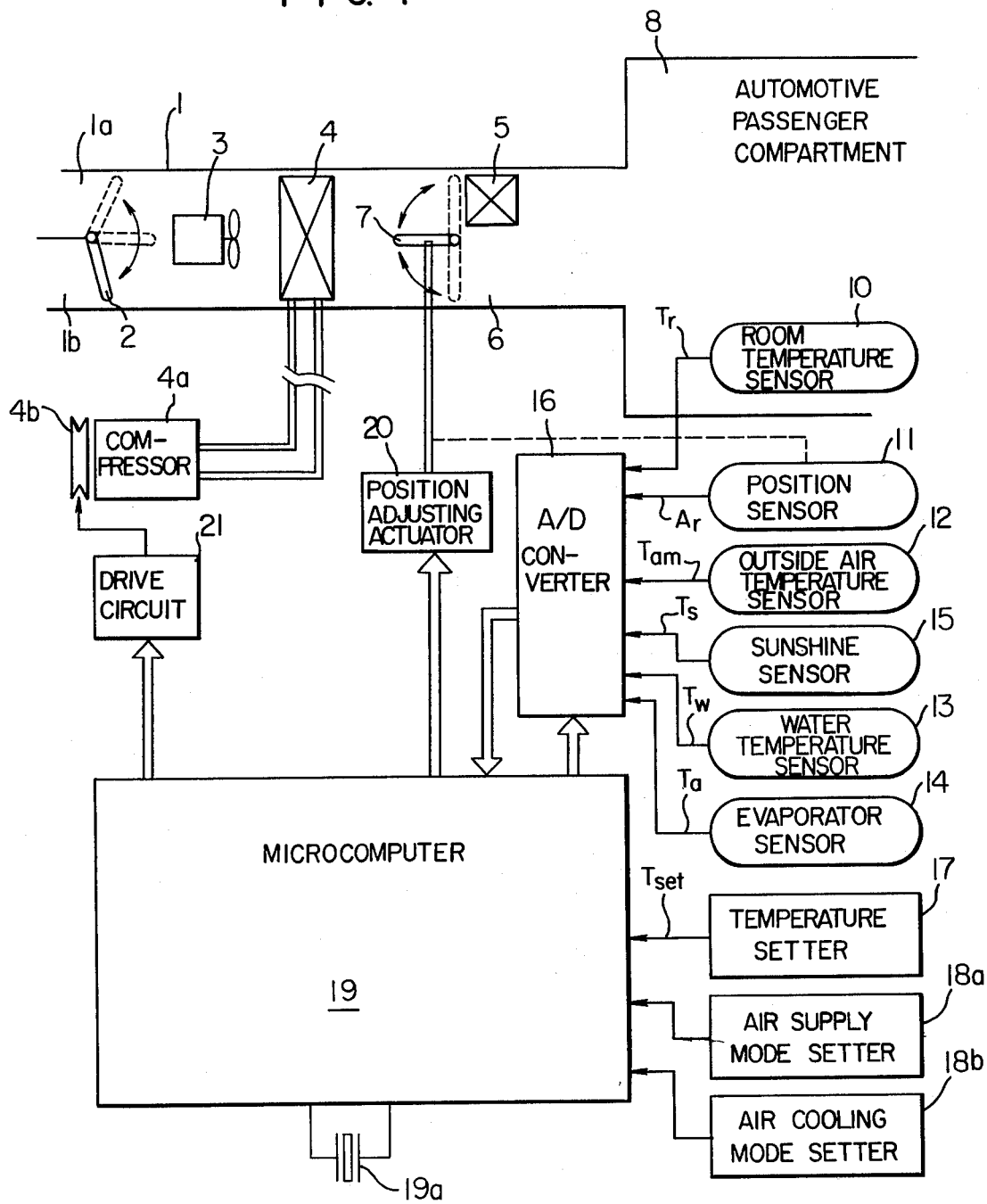
FIG. 1 is a block diagram showing the overall construction of a cooling power control device of an embodiment of the present invention.

FIG. 1 shows an overall arrangement of a cooling power control device for an automotive air conditioner of an embodiment of the present invention. In the figure, reference numeral 1 designates an air duct disposed at the front of an automotive passenger compartment (hereinafter referred to as passenger compartment) 8, which communicates at its upstream portion with an air intake portion 1a of the air duct 1 for taking in air from the outside of the passenger compartment (hereinafter referred to as outside air) and with another air intake portion 1b of the air duct 1 for picking up the air from the inside of the passenger compartment (hereinafter referred to as inside air). An air switching damper 2 is switched manually so as to select one of a first air intake condition of taking the outside air into the air duct 1, a second air intake condition of taking the inside air into the air duct 1 and a third air intake condition of taking into the air duct 1 a mixture of the outside air and the inside air. A blower motor 3 is supplied with an electric current from a car-carried battery when a main switch (not shown) is turned on, and generates an air stream flowing from the switching damper 2 toward the passenger compartment 8.

An evaporator 4, serving as a heat exchanger of a cooling device, cooperates with a compressor 4a fed by the car-carried battery and with other related components (not shown) to form a cooling device for cooling the air stream flowing through the air duct 1. The cooling device, having an electromagnetic clutch 4b for coupling the compressor 4a with an engine, effects the cooling operation of the air, when the clutch is energized. A heater 5 acts as a heat exchanger and uses the recirculating cooling water for the car-carried engine as a heat source. The heater 5 occupies about half of the cross section of the duct 1, while the other half of the duct cross section serves as a bypass 6.

An air mixing damper 7 or other temperature regulating member is used to change a ratio of the air cooled by the evaporator 4 and then heated by the heater 5 to the air directly passing through the bypass 6, thereby controlling the temperature of the air supplied from the duct 1 into the passenger compartment 8.

A room temperature sensor 10 produces an analog signal representing air temperature Tr in the passenger compartment 8. A position sensor 11 produces an analog signal Ar representing a position of the air mixing damper 7. An outside outside air temperature sensor 12 generates an analog signal Tam representing an air temperature outside the passenger compartment. A water temperature sensor 13 generates an electric analog signal Tw representing a water temperature at the inlet for the cooling water to the heater 5. An evaporator sensor 14 generates an electrical analog signal Ta representing an air temperature immediately downstream from the evaporator 4 in the duct 1. A sunshine sensor 15 produces an analog signal Ts representing an amount of sunshine heat radiation incident to the passenger compartment 8 or an amount of the sunshine light radiation. The signals produced from these sensors are converted into binary-coded signals by an analog to digital converter 16.

A temperature setter 17 of the digital type stores a desired room air temperature set by a vehicle driver in the form of a corresponding digital value Tset. An air supply mode setter 18a for setting a mode of air supply produces a digital signal representing a desired direction of air supply set by the driver, in accordance with a position of a member for switching the direction of air supply (which may be manually operable). In the preferred embodiment, it is only necessary for the air supply mode setter 18a to detect a state of the defroster air supply as a direction of the air supply.

An air cooling mode setter 18b is associated with the air cooling device and comprises of a manual switch. Air cooling mode setter 18b selects one of three modes, continuous operation, stoppage of the cooling device and an automatic control of the drive and stoppage of the cooling device.

A digital computer 19 systematically controls the electromagnetic clutch 4b and the air mixing damper 7 in the air cooling device. During the course of the computation processing in accordance with a control program previously stored in the memory contained therein, the computer 19 responds to input signals from the sensors and the setters to provide a position adjusting control signal for the air mixing damper 7 and a control signal for coupling or decoupling the magnetic clutch 4b.

The digital computer or a so-called microcomputer comprises a one chip LSI (large scale integration) integrated circuit mainly containing a program memory (ROM) for storing an air conditioning control program, a central processing unit (CPU) for executing the computation processing in accordance with the program, a temporary memory (RAM) for temporarily storing a variety of data relating to the computation processing process by the CPU, a timing circuit comprising a crystal oscillator 19a for generating reference clock pulses in use for the computation processing, and an input/output circuit for adjusting input and output signals.

A position adjusting actuator 20 for the air mixing damper 7 is made up of an electro-magnetic transducer which responds to a position adjusting control signal from the digital computer 19 to change a position of the air mixing damper 7.

A drive circuit 21 for driving the compressor 4a is made up of a switching circuit which responds to a coupling or decoupling control signal from the digital computer 19 to switch the electro-magnetic clutch 4b between the energization and deenergization thereof.

FIG. 2 shows a control program for the computation processing in the digital computer 19. The digital computer 19 is supplied with electric power through a stabilized power source circuit (not shown) from the car-carried battery when the main switch is turned on. Upon supply of electric power, the digital computer 19 repeats the computation processing shown in the figure at the period of several hundred ms. In the figure, there is illustrated only the steps from 101 to 112 essential to the present invention.

The control program includes a signal input step 102 for reading input signals from the respective input units. In the input signal reading step 102, the output signals from the sensors 10 to 15 which are converted in binary-coded signals by the analog-to-digital (or A/D) converter 16 are stored into given addresses of the RAM, and the setting signals from the setters 17, 18a and 18b are stored into given addresses of the RAM.

In a computing step 103, a temperature Tao of the supply air from duct 1 required for holding the passenger compartment temperature at a value near a desired temperature previously set is computed on the basis of the data representing an ambient condition in the passenger compartment. The calculation is conducted by using constants empirically found in accordance with the following equation $$Tao = Kset \times Tset - Kr \times Tr - Kam \times Tam - Ks \times Ts + C$$

where Tset, Tr, Tam and Ts are values obtained from temperature setter 17 and the sensors 10, 12 and 15, respectively, and Kset, Kr, Kam, Ks and C are predetermined constants.

In the next computing step 104, a necessary position SW of the air mixing damper 7 is computed for actually obtaining the required supply air temperature Tao calculated in the computing step 103 from the duct 1. The calculation is performed using the following equation, referring to the actual heat exchange power:

$$SW = (Tao - Ta)/(TW - Ta - D_1) \times D_2$$

where Ta and TW are values from the sensors 14 and 13, respectively, and $D_1$ and $D_2$ are predetermined constants.

In the processing step 105, the position SW of the air mixing damper 7 calculated by the step 104 is compared with an actual damper position Ar obtained by the sensor 11 to provide a position adjusting control signal to the position adjusting actuator 20 so that the latter approaches the former (ensuring a given tolerance).

For further details of the steps 103, 104 and 105, reference is made to Japanese Patent Application Kokai (Laid-Open) 77659/80.

In a deciding step 106, the signal from the air supply mode setter 18a is checked on the basis of the stored value of the RAM to decide whether the driver desires the defroster air supply or not. When it is desired, the program jumps to the instruction step 110. In other cases, the next two steps 107 and 108 are executed.

In the deciding steps 107 and 108, the signal from the air coding mode setter 18b is checked on the basis of the stored value of the RAM to decide whether the driver desires the continuous operation, either on or off of the operation of the cooling device. When the result of the decision is YES, i.e. when he desires either of the two, the program jumps to the instruction step 110 or 111.

In the instruction step 110, a control signal for energizing the compressor is applied to the drive circuit 21 for actuating the cooling device. In the instruction step 111, a control signal for deenergizing the compressor is applied to the drive circuit 21 for stopping the cooling device.

Thus, for setting the cooling device to continuous operation either on or off, the driver may operate the air cooling mode setter 18b.

When such a mode is not set or when an automatic control mode is set by the air cooling mode setter 18b (when the defroster air supply is not set by the air supply mode setter 18a), the deciding step 109 determines the operation or stoppage of the cooling device with reference to the predetermined condition. In the deciding step 109, by using the required supply air temperature Tao calculated by the calculation step 103 and the outside air temperature Tam obtained in the input signal reading step 102, the operation or the stoppage of the cooling device is determined through the comparison of a difference Tao−Tam with given threshold values R1 and R2. In the decision, a small hysteresis is provided for preventing hunting.

As the result of the decision, when the difference between the required supply air temperature Tao and the outside air temperature Tam exceeds the threshold value R2, the stop mode of the cooling device is selected. When it is smaller than the value R1, the operation mode is selected. In this way, when either one of the two modes is selected, the program advances to the instruction step 110 or 111 to provide a control signal to the drive circuit 21 to execute the selected mode.

The program steps as described above are repetitively executed. When the ambient condition in the passenger compartment 8 changes, the position of the air mixing damper 7 is adjusted so as to follow the condition change, so that the temperature of supply air into the passenger compartment is suitably changed to keep the actual passenger compartment temperature at a desired temperature. At the same time, the operation or stop mode of the cooling device is determined corresponding to the supply air temperature. In this way, it is possible to attain air cooling accurately corresponding to the operating conditions of the automative air conditioner.

In implementing the present invention, a temperature value actually measured upstream from evaporator 4 in the duct may be used as the intake air temperature, in place of the temperature of the outside air. When the air is taken from the passenger compartment, the actually measured value of the passenger compartment temperature may be used.

The cooling power of the cooling device may be changed not by the coupling and decoupling of the compressor but by any other suitable means.

We claim:

1. An automotive air conditioner for regulating the air temperature within an automotive passenger compartment comprising:
   (a) air duct means for supplying air to said automotive passenger compartment;
   (b) blower means for producing an air stream in said air duct means;
   (c) air temperature changing means including:
      cooling means disposed in said air duct means for lowering the temperature of said air stream;
      heating means disposed in said air duct means for raising the temperature of said air stream; and
      temperature adjusting means for controlling the effects of said cooling and heating means;
   (d) sensor means including:
      room temperature sensor means for generating a signal indicating the temperature of air within said automotive passenger compartment;
      outside air temperature sensor means for generating a signal indicating the ambient air temperature outside said passenger compartment;
      cooling power sensor means for generating a signal indicating the cooling power of said cooling means; and
      heating power sensor means for generating a signal indicating the heating power of said heating means;
   (e) temperature setter means for manually selecting a desired temperature of said passenger compartment; and
   (f) electronic control means for:
      computing a required temperature of said air stream from said signals generated by said room temperature sensor means, said outside air temperature sensor means, and said desired passenger compartment temperature of said temperature setting means, and generating a first control signal to control said temperature adjusting means according to said computed required temperature and signals generated by said cooling power sensor means and said heating power sensor means, and
      comparing said computed required temperature with said signal from said outside air temperature sensor means and generating a second control signal for determining the cooling power of said cooling means.

2. An automotive air conditioner device according to claim 1, wherein said heating means is disposed downstream with respect to the flow of said air stream from said cooling means in said air duct means.

3. An automotive air conditioner device according to claim 1, wherein said cooling means is mechanically coupled to the automobile engine through an electromagnetic clutch, said cooling means cooling said air stream energized.

4. An automotive air conditioner device according to claim 1, wherein said temperature adjusting means includes an air mixing damper for regulating a ratio of an amount of air cooled by said cooling means and then heated by said heating means to an amount of air cooled by said cooling means and which bypasses said heating means without being heated thereby, to adjust the temperature of air supplied by said air duct into said automotive passenger compartment.

5. An automotive air conditioner device according to claim 1, wherein said sensor means comprises an outside temperature sensor.

6. An automotive air conditioner as in claim 1 further comprising:
   first drive means responsive to said first control signal for controlling said temperature adjusting means; and
   second drive means responsive to said second control signal for controlling the cooling power of said cooling means.

7. An automotive air conditioner according to claim 1, wherein:

said cooling means comprises an evaporator;

said heating means comprises a heater core having a water inlet and outlet;

said cooling power sensor means comprises a temperature sensor means for producing an analog electrical signal indicative of the temperature of said air stream immediately downstream of said evaporator in said air duct means; and said heating power sensor means comprises a temperature sensor means for producing an analog electrical signal indicative of a water temperature at said cooling water inlet of said heater core.

8. An automotive air conditioner according to claim 1, wherein said sensor means further includes a sunshine sensor for producing an analog electrical signal indicative of an amount of solar infrared radiation incident to said passenger compartment, said analog signal being supplied to said computing means to provide additional data to be used in the computation of said first control signal.

9. An automotive air conditioner according to claim 1, wherein said electronic control means further includes analog-to-digital converter means for converting said signals generated by said sensor means into binary-coded digital signals and for supplying said digital signals to said computing means.

* * * * *